United States Patent [19]

Biggs

[11] 4,269,422
[45] May 26, 1981

[54] QUICK RELEASE LOCKING CHUCK MECHANISM

[76] Inventor: Eugene S. Biggs, 172 E. 3000 South, Bountiful, Utah 84010

[21] Appl. No.: 91,048

[22] Filed: Nov. 5, 1979

[51] Int. Cl.³ .................... B23B 31/18; B23B 31/14
[52] U.S. Cl. .................................... 279/38; 279/1 B; 279/1 C; 403/330
[58] Field of Search ................. 279/1 B, 1 C, 35, 38, 279/58, 66, 107; 403/322, 330

[56] References Cited
U.S. PATENT DOCUMENTS

| | | | |
|---|---|---|---|
| 1,990,525 | 2/1935 | Chancellor | 279/1 C X |
| 2,654,135 | 10/1953 | Grizzard et al. | 279/38 X |
| 2,726,060 | 12/1955 | Elsner | 279/1 B X |
| 3,907,312 | 9/1975 | Fletcher et al. | 279/1 B X |
| 4,032,163 | 6/1977 | Holt | 279/1 B X |

Primary Examiner—Robert D. Baldwin

Attorney, Agent, or Firm—Terry M. Crellin; B. Deon Criddle

[57] ABSTRACT

A chuck assembly which is adapted for quick and easy engagement and disengagement with work arbors having various working tools mounted thereon. The chuck assembly comprises an elongate cylindrical chuck member having a longitudinal bore extending therethrough. One end of the chuck member is adapted to be attached to the shaft of a drive motor and the other end is adapted to receive a work arbor in concentric engagement therewith. Means are provided in combination with the chuck member for positively locking the work arbor in engagement with the chuck member when the chuck member and arbor are in rotational movement about their longitudinal axes. When the chuck assembly is at rest, the arbor is easily and quickly disengaged from the chuck member by moving the locking means to its disengaging position and pulling the arbor from the end of the chuck member.

5 Claims, 12 Drawing Figures

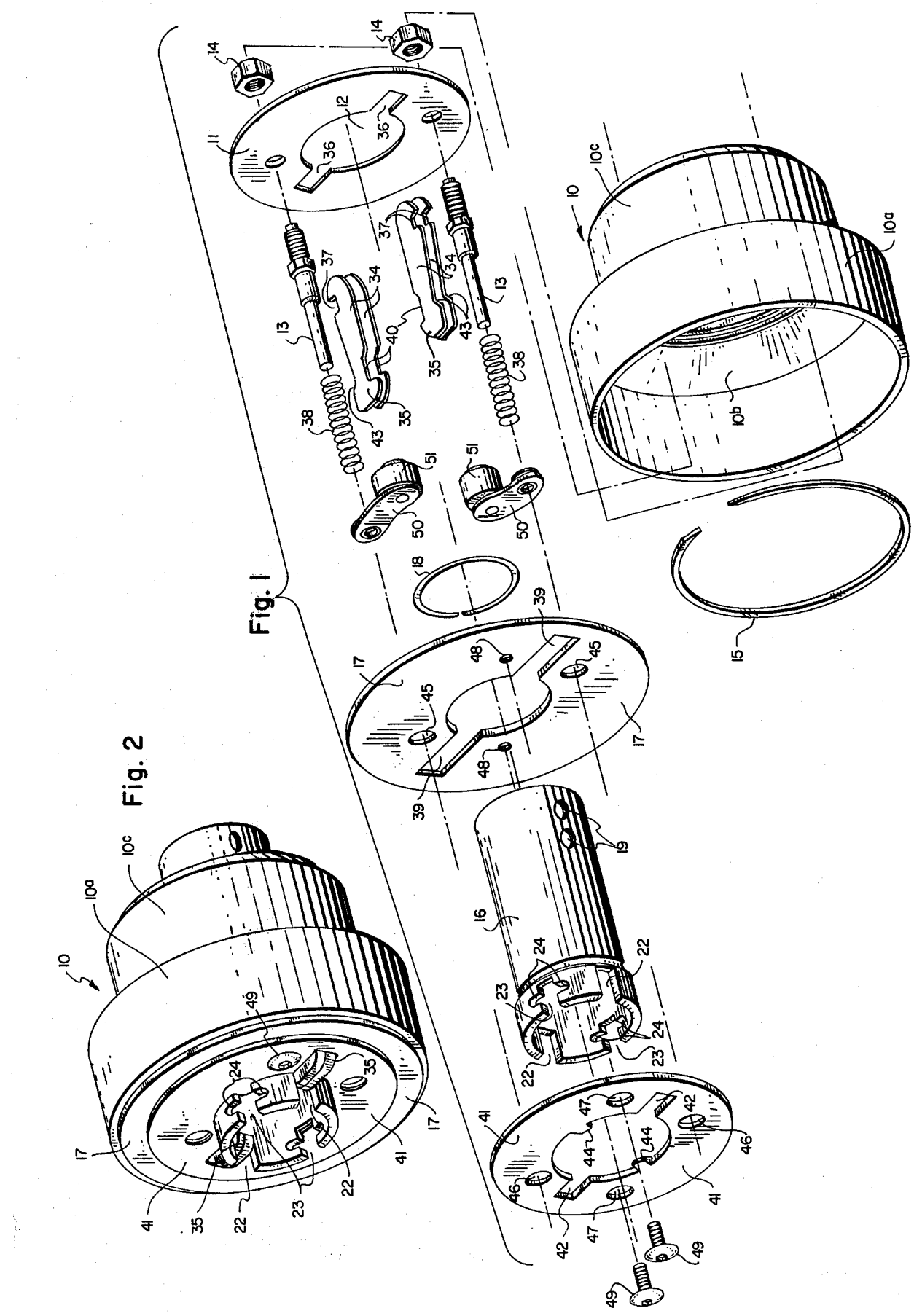

QUICK RELEASE LOCKING CHUCK MECHANISM

BACKGROUND OF THE INVENTION

1. Field:

The present invention relates to chuck assemblies adapted for quick engagement and disengagement of work arbors having various working tools mounted thereon. In particular, the invention, relates to chuck assemblies which exert a positive locking grip on the work arbor during rotation of the chuck assemblies.

2. State of the Art:

Various types of chuck assemblies have been utilized for securely engaging the arbor or shank of a working tool. Many attempts have been made to employ centrifugal forces inherent in the rotation of the chuck assembly for retaining the tool shank or arbor in the rotatable chuck. Representative devices of this type are shown in U.S. Pat. Nos. 885,392; 1,990,525; 2,356,245; 2,394,861; 2,431,961; 2,495,050; 3,467,404; and 3,709,508. The centrifugally operated chuck assemblies of the above patents exert gripping forces that are wholly dependent upon and directly related to the rotational speed of the chuck. For heavily loaded tools or for low rotational speeds, or some combination thereof, such gripping forces may not be sufficient to properly secure the tool.

3. Objectives:

A principal objective of the present invention is to provide a chuck assembly which is readily installed on the drive shaft of a motor to convert the motor into a versatile work center, wherein various working tools are easily, rapidly, and safely engaged to and disengaged from the chuck assembly. An additional objective is to provide a chuck assembly which utilizes positive interlocking spring actuated engagement of the arbor or shaft of the working tool, wherein centrifugal forces of the rotation of the chuck assembly provide means for locking the assembly in engagement with the arbor or shaft of the working tool.

SUMMARY OF THE INVENTION

The above objectives are achieved in accordance with the invention by a chuck mechanism which is adapted to fit on the drive shaft of an electric motor and securely engage the arbor or shaft of a tool while allowing for easy release thereof. In general, the arbor or shaft of a tool which is to be attached to the chuck mechansim is received longitudinally into the bore of an elongate cylindrical chuck member, and a pair of locking fingers spaced around the chuck member engage and hold a shoulder on the arbor or shaft. Spring means are provided for urging the fingers into engagement with the shoulder on the arbor or shaft of the tool. A sliding disengagement mechanism is adapted to release the fingers from engagement with the arbor or shaft, and a centrifugally driven locking device prevents sliding movement of the disengagement mechansim when the chuck mechansim is rotated, thereby positively preventing disengagement of the arbor or shaft during rotation of the chuck mechanism. When the chuck mechanism is at rest, the sliding disengagement mechanism is easily moved against the spring bias to release the fingers from engagement with the arbor or shaft, and the tool is quickly removed from the chuck mechanism.

Additional objects and features of the present invention will become apparent from the following detailed description of a preferred embodiment taken in conjunction with the accompanying drawings.

THE DRAWINGS

A preferred embodiment of the chuck mechanism of the present invention representing the best mode presently contemplated of carrying out the invention is illustrated in the accompanying drawings, in which:

FIG. 1 is an exploded pictorial of a chuck mechanism in accordance with the invention.

FIG. 2 is a pictorial showing the assembled chuck mechanism of FIG. 1;

DETAILED DESCRIPTION OF THE ILLUSTRATED EMBODIMENT

As illustrated, a chuck assembly which is adapted for quick and easy engagement and disengagement with work arbors having various working tools mounted thereon, includes a housing 10 having one substantially open, circular end and an opening in the other end which is substantially coaxial with the open end. An anchor assembly comprising a substantially circular anchor plate 11 is mounted on the inside of the housing 10. The anchor plate 11 has a central opening 12 therethrough (FIG. 1) which is coaxial with the axis through the open end of the housing 10.

Figure 3:
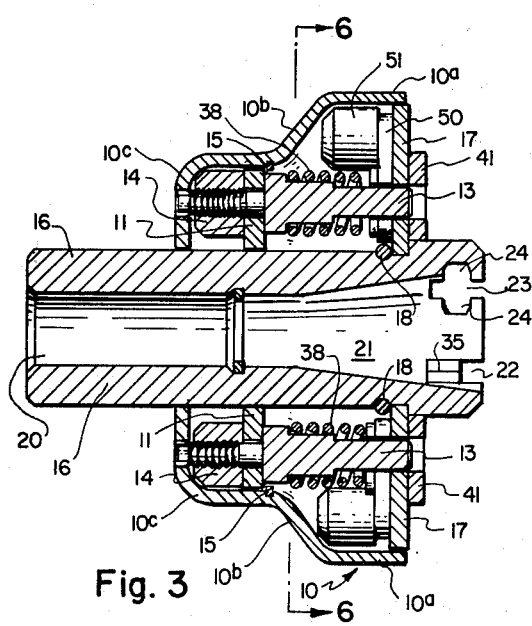
FIG. 3 is a longitudinal sectional view through the chuck mechanism taken on line 3—3 of FIG. 6 and showing the mechanism in its locked position.
Figure 4:
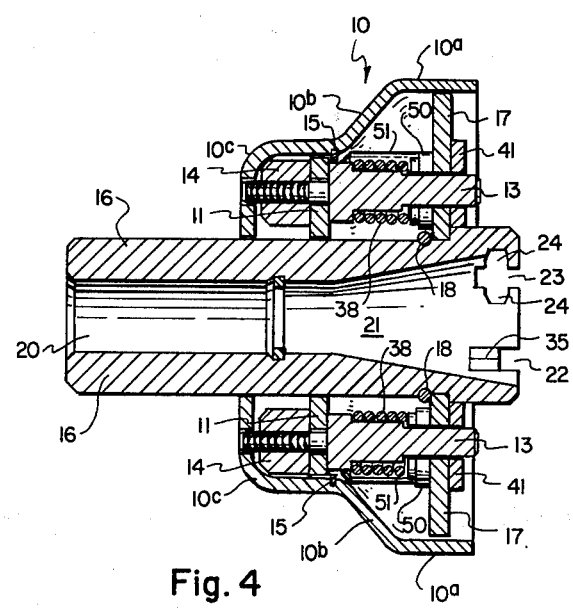
FIG. 4 is a view similar to that of FIG. 3, showing the mechanism in its unlocked or disengaging position.

Preferably, the housing 10 comprises a cylindrical section 10a open at one end which forms the circular open end of the housing, a truncated conical section 10b having its base end attached to the other end of the cylindrical section, so as to extend coaxially from the other end of the cylindrical section, and a dome section 10c which has an opening therein which forms the opening in the other end of the housing 10. The anchor plate 11 is preferably mounted on the inside of the dome or cup-like section 10c, and has a pair of torque shafts mounted diametrically opposite each other so that they extend through the conical section 10b and cylindrical section 10a of the housing 10. As shown, the torque shafts 13 are threaded at mutually respective ends, with the threaded ends fitting through respective bores in the anchor plate 11. Nuts 14 are threaded on the ends of the torque shafts 13 to securely hold them to the anchor plate 11. As best shown in FIGS. 3 and 4, the threaded ends of the torque shafts 13 extend beyond the nuts 14 and are slidably received in openings in the domed section 10c of the housing 10. The anchor plate is mounted on the inside of the dome or cup-like section 10c of housing 10 by a split rim 15 (see FIGS. 1, 3, and 4).

An elongate chuck member 16 having a longitudinal bore extending from one end to the other end thereof is fitted longitudinally through the opening in the anchor plate 11. A substantially circular face plate 17 is positioned near one end of the chuck member 16, so that in the assembled unit, the face plate 17 is located coaxially adjacent to the open end of the housing 10. The face plate 17 is mounted to the chuck member 16 sliding over the surface of the chuck member into engagement with a shoulder therearound next to one end thereof. A split ring 18 retains the face plate 17 in firm engagement with the shoulder on the chuck member 16. The other end of the chuck member 16 extends coaxially outwardly from the opening in the domed or cup-like end of the housing 10. The end of the chuck member 16 which extends from the domed or cup-like end of the housing 10 is adapted to be attached to the shaft of a drive motor. As illustrated, a pair of threaded bores 19 are provided in the cylindrical wall of the chuck member 16 to accept set screws for firmly attaching the unit to the drive shaft of a motor. The housing 10 and the anchor plate 11 and associated torque shafts 13 are adapted for limited reciprocating movement longitudinally along the chuck member 16 as will be further described hereinafter.

Figure 7:
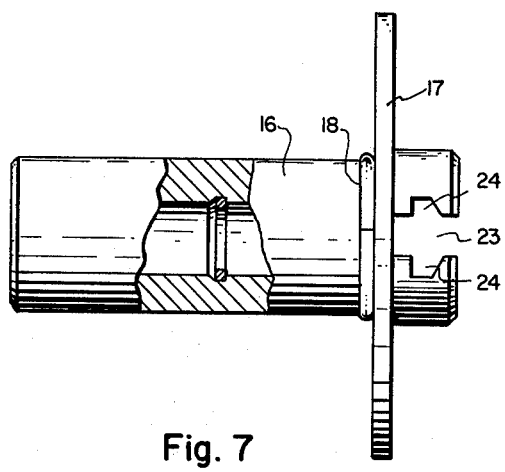
FIG. 7 is an elevational view of the longitudinal chuck member component of the chuck mechanism and its associated face plate mounted near one end thereof.
Figure 8:
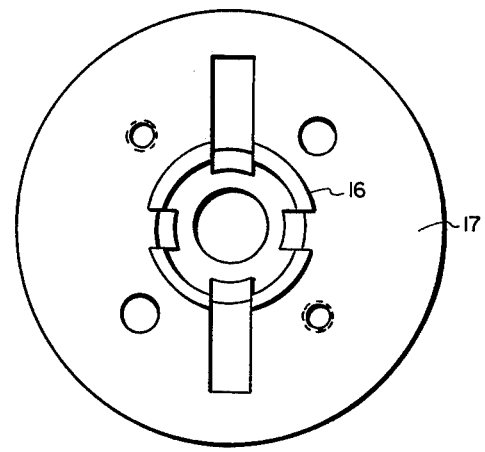
FIG. 8 is an end view taken along line 8—8 of FIG. 7.
Figure 5:
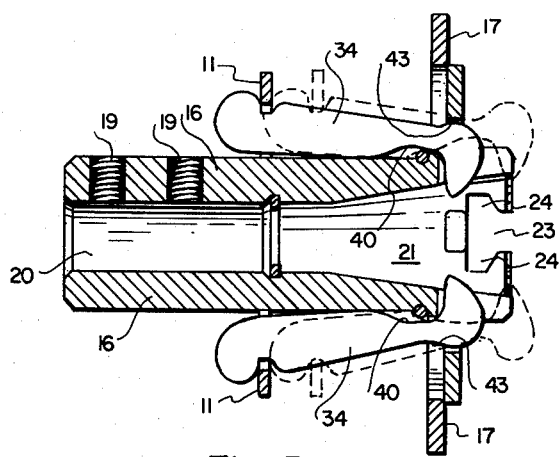
FIG. 5 is a longitudinal sectional view through the chuck mechanism taken on line 5—5 of FIG. 6, with the bell housing and centrifugal locking weight mechanism omitted to more clearly show the locking fingers and their operation.
Figure 6:
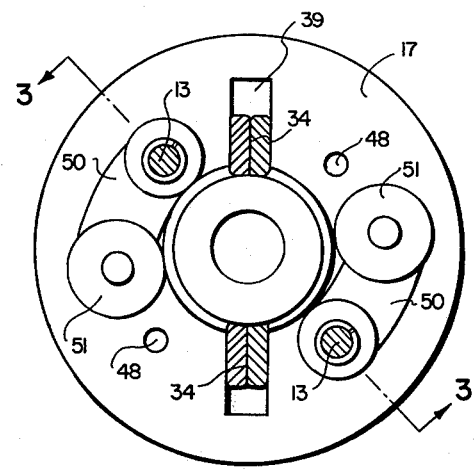
FIG. 6 is an axial cross-sectional taken along line 6—6 of FIG. 3.

The longitudinal bore in the chuck member 16 preferably comprises two sections; one section at one end adapted to receive the drive shaft of a motor and the other section at the other end adapted to receive a work arbor in locked engagement therewith. The first section 20 of the bore (FIGS. 3-5) has the same diameter throughout its length with means such as the threaded bores 19 as mentioned above for securing the chuck member to a drive shaft. The second section 21 of the bore (FIGS. 3-5) flares outwardly from the intersection of the two section about midway between the ends of the bore. The end of the chuck member 16 comprising the open end of the flared or second section 21 has at least one pair of diametrically opposed slots 22 in the cylindrical wall of the chuck member 16. These slots are used for positioning a pair of locking fingers which will be described hereinafter. A second pair of diametrically opposed slots 23 extend inwardly in the cylindrical wall of and substantially parallel to the longitudinal axis of the chuck member 16. The second pair of slots 23 are positioned equidistant from the first pair of slots 22 and extend inwardly from the same end of the chuck member 16 as do the first pair of slots 22. Preferably, the second pair of slots 23 have opposite facing notches 24 in the mutually respective sides thereof.

Figure 9:
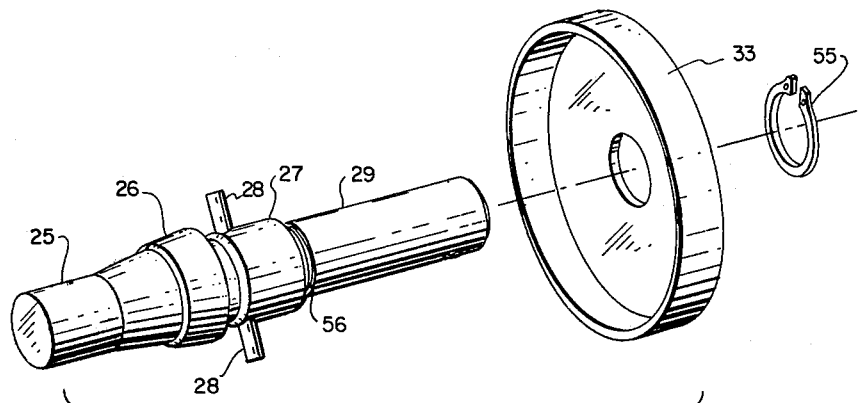
FIGS. 9-12 are pictorials of various arbors which can be used with the chuck mechanism of FIG. 1.
Figure 10:
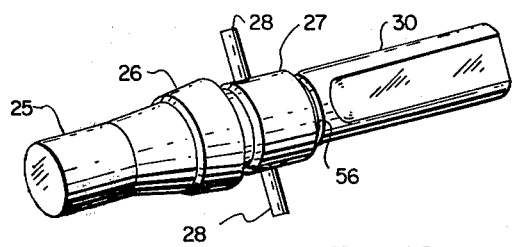
Figure 11:
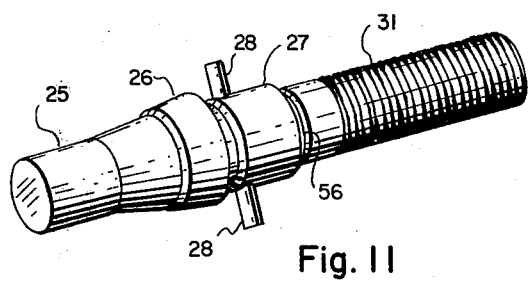
Figure 12:
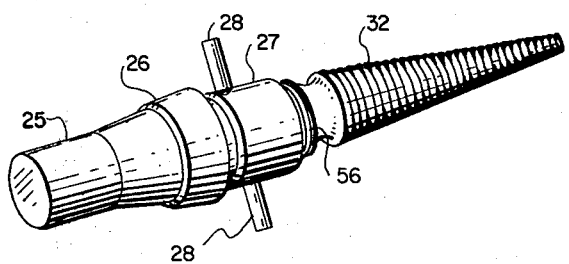

The flared section 21 of the bore is adapted to receive an arbor therein. The arbor can be of the type shown in FIGS. 7-10. Such arbors comprise a short cylindrical section 25 at mutually respective ends thereof. The sections 25 have a diameter such that they can fit within the first section 20 of the bore in the chuck member 16. An outwardly flared portion 26 of the arbors is positioned adjacent to the inner end of the short cylindrical section. The portion 26 is adapted to nest within the flared section 21 of the bore in the chuck member 16. When the arbor is engaged in the flared section 21 of the chuck member 16, the cylindrical section 25 enters a portion of the inner end of bore 20 of the chuck member. A portion of the flared section 26 of the arbors can be undercut as shown in the drawings such that a band at the end of the flared section 26 engages the flared section 21 of the bore in the chuck member 16. Spindles 27 having respective diameters smaller than the outwardly flared ends of the flared sections 26, extend from the outwardly flared ends of the flared sections 26 of the arbors thereby forming sharp angled shoulders around the arbors between the flared sections 26 and spindles 27. The spindles 27 have pins or ears 28 extending diametrically opposite therefrom for purposes to be more fully explained hereinafter. Various working shanks extend outwardly from the outward face of spindles 27. Shank 29 of FIG. 9 is a cylindrical shaft, shank 30 of FIG. 10 is a cylindrical shaft with a flat area ground in the surface thereof, shank 31 of FIG. 11 is a threaded shaft, and shank 32 of FIG. 12 is tapered downwardly toward its free end as well as being threaded. In all instances, a finger guard 33 as shown in FIG. 9 is adapted to abut against the spindles 27 and extend radially outwardly from the shanks. The finger guard 33 is held firmly seated against the spindles 27 by a split retaining ring 55 (FIG. 9) which engages a groove 56 in the shanks. The shanks 29, 30, 31, 32, as shown, are representative of various means which are used in attaching a work tool such as a grinding stone, wire brush, buffing brush, etc., to the arbors, as is well known in the art.

A pair of locking fingers 34 are positioned on opposite sides of the chuck member 16 so as to extend longitudinally along the outer sidewall of the chuck member 16. As illustrated, each of the locking fingers 34 is made of two pieces of stamped metal sheet placed face-to-face. The fingers 34 could just as well be formed from a solid sheet of metal. The fingers 34 have hooks 35 at mutually corresponding ends thereof. The hooks 35 are adapted to fit into and extend through the pair of slots 22 in the chuck member 16. The other mutually corresponding ends of the locking fingers 34 are pivotally attached to the anchor plate and are, thus, adapted to move longitudinally along the chuck member 16 with the housing 10 and anchor plate 11. As illustrated, the anchor plate 11 has a pair of diametrically opposed notches 36 (FIG. 1), and the other ends of the locking fingers 34 have complementary notches 37 therein which engage the notches 36 in the anchor plate 11 thereby permitting the locking fingers 34 to pivot outwardly from the chuck member 16.

Spring means are provided between the anchor plate 11 and the face plate 17 biasing the anchor plate 11 and attached housing 10 to a rest position away from the end of the chuck member 16 to which the face plate 17 is mounted. As illustrated, the spring means comprises a pair of coil springs 38 which are positioned concentrically about the torque shafts 13, respectively.

Means are provided for pivoting the hook ends 35 of the locking fingers 34 inwardly through the slots 22 in the chuck member 16 when the housing 10 is in its biased, rest position. In the illustrated embodiment, a pair of slots 39 are provided in the face plate 17 so as to extend radially outwardly from the corresponding slots 22 in the chuck member 16. The slots 39 provide a guide way for the pivotal movement of the locking fingers 34. Camming notches 40 are provided on the sides of the locking fingers 34 which face the cylindrical wall of the chuck member 16. As the housing 10 and anchor plate 11 are moved towards the face plate 17 against the biasing force of springs 38, the trailing surface of the camming notches 40 engage the split ring 18 adjacent to the side of the face plate 17 so as to force the hook ends 35 of the locking fingers 34 outwardly away from the surface of the chuck member 16. A guide plate 41 is positioned over the outwardly facing surface of the face plate 17. The guide plate 41 has a pair of slots 42 which are adapted to register with the respective slots 39 in the face plate. However, the depth of slots 42 is less than that of slots 39, and when the housing 10 and anchor plate 11 are allowed to slide away from the face plate 17 under the biasing force of springs 38, camming surfaces 43 on the outside edges of the hook ends 35 of locking fingers 34 engage the inner end surfaces of slots 42 so as to force the locking fingers 34 toward the surface of the chuck member 16.

A pair of lugs 44 (FIG. 1) are provided on the inner circular opening of guide plate 41 which are aligned with and received in the second pair of slots 23 of the chuck member 16. Two pairs of openings 45 and 46, respectively, are provided in the face plate 17 and guide plate 41. The openings 45 and 46, are aligned concentrically and permit passage of the ends of the torque shafts 13 therethrough as the housing 10 and anchor plate 11 are moved towards the end of the chuck member 16 to which the face plate 17 is attached. A second pair of openings 47 are provided in guide plate 41, and the openings 47 register in concentric alignment with threaded bores 48 in the face plate 17. Attaching screws 49 extend through the openings 47 in the guide plate 41 and engage the threaded bores 48 to securely hold the guide plate 41 to the face plate 17.

Means are also provided for mechanically locking the housing 10 in its biased rest position, i.e., in its position most remote from the face plate 17, when the chuck assembly is being rotated about the longitudinal axis of the chuck member 16. As illustrated, the means for locking the housing 10 in its biased, rest position comprises a pair of locking arms 50 pivotally mounted, respectively, to the torque shafts 13. The coil springs 38 retain the locking arms 50 in sliding contact with the inside face of the face plate 17, and the torque shafts 13 are adapted to slide longitudinally back and forth through the pivotal connection to the locking arms 50. A pair of locking weights 51 are attached to the free ends of the locking arms 50. When the housing 10 is in its biased, rest position as shown in FIG. 3 and the chuck assembly is shown in FIG. 3 and the chuck assembly is rotated about the longitudinal axis of the chuck member 16, the locking arms 50 and weights 51 pivot outwardly due to centrifugal force applied thereto by the rotation of the chuck assembly. The locking weights 51 are firmly held by centrifugal force against the inside surface of the cylindrical section of the housing 10, thus positively preventing longitudinal movement of the housing 10 along the chuck member towards the face plate 17. When the rotation of the chuck assembly is stopped, the housing 10 can readily be moved along the chuck member 16 towards the face plate 17 inasmuch as the locking weights 51 are then readily pivoted inwardly by the surface of the conical section of the housing 10. As is shown in FIG. 3, the locking weights 51 contact the sloping portion of the housing 10 when the housing is moved in a direction towards the face plate 17, and the weights 51 are easily cammed inwardly along the sloping portion of the housing. When the assembly is being rotated, the centrifugal force on the weights 51 are sufficient to prevent inward pivoting of the weights 51 and thus positively prevents movement of the bell housing 10.

In operation, an arbor is selected to be engaged in the chuck mechanism, and the chuck mechanism is attached to the drive shaft of a motor. The arbor is inserted centrically into the second or flared section 21 of the bore through the chuck member 16. The cylindrical end 25 of the arbor is inserted through the flared section 21 of the bore in the chuck member 16 and engages the inside end of the cylindrical portion 20 of the bore, and the flared section 26 of the arbor mates with the flared section 21 of the bore in the chuck member 16. Preferably, a split rim 52 is inserted in a groove around the cylindrical section 26 of the bore in the chuck member 16 so as to provide a stop upon which the end 25 of the arbor abuts as the arbor is inserted into the bore of the chuck member 15. The bell housing 10 is moved to its forward position toward the face plate 17 thereby pivoting the hooks 35 on the respective fingers 34 outwardly to allow the shoulder at the base of the flared section 26 of the arbor to slide past the hooks 35 and into the flared section 21 of the bore in the chuck member 16. The fingers 34 are shown in their outwardly pivoted positions by dashed lines in FIG. 5, and the bell housing 10 is shown in its forward position with the coil springs 38 compressed in FIG. 4. Once the arbor has been positioned in the bore of the chuck member 16, the housing 10 is released and moves back to its rest position away from the face plate 17 due to the forces of the coil springs 38. The bell housing 10 is shown in its rest position in FIG. 3.

As the bell housing moves back to its rest position, the fingers 34 are pivoted inwardly, and the hooks 35 engage the shoulder on the arbor so that the arbor is mechanically locked in engagement with the chuck mechanism. The ears 28 on the arbor engage the slots 23 on the chuck mechanism to prevent any relative rotational movement of the arbor with respect to the chuck mechanism.

As the motor to which the chuck mechanism is attached turns on, the chuck mechanism rotates and the locking weights pivot outwardly so as to positively prevent any movement of the bell housing 10 which could release the arbor held in the chuck member 16. Under no circumstances will the arbor and the working tool thereon come disengaged from the chuck mechanism during the use of the tool.

Changing one tool for another is both quick and easy. With the chuck mechanism at rest, i.e., not rotating, the bell housing is moved forward in a direction toward the face plate 17 to release the hooks 35 from engagement with the shoulder on the arbor. The arbor is removed from the bore of the chuck member 16, and a different arbor containing the next desired tool thereon is inserted into the bore.

It is to be understood that the present disclosure, including the detailed description of a preferred embodiment of the invention, is made by way of example and that various other embodiments are possible without departing from the subject matter coming within the scope of the following claims, which subject matter is regarded as the invention.

I claim:

1. A chuck assembly adapted for quick and easy engagement and disengagement with work arbors having various working tools mounted thereon, said chuck assembly comprising:

a housing having a substantially circular open end and an opening in the other end which is substantially coaxial with said open end;

an anchor assembly including a substantially circular anchor plate mounted on the inside of said housing, said anchor plate having a central opening therethrough which is coaxial with the axis through the open end of the housing;

an elongate chuck member having a longitudinal bore extending from one end to the other end thereof, said chuck member also having a substantially circular face plate mounted near one end thereof, said chuck member being mounted longitudinally through the opening in said anchor plate with the face plate at one end thereof positioned coaxially adjacent to the open end of said housing, and with the other end of said chuck member extending coaxially outwardly from the opening in said other end of said housing, whereby said housing is adapted for reciprocating movement longitudinally along said chuck member;

at least one pair of diametrically opposed slots in the cylindrical wall of said chuck member extending from said one end of said chuck member to the face plate mounted near said one end of said chuck member, with said one end of said chuck member otherwise being adapted to receive a work arbor in concentric engagement therewith, and said other end of said chuck member being adapted to be attached to the shaft of a drive motor;

a pair of locking fingers having hooks at mutually corresponding ends thereof, said hooks being adapted to fit into and extend through the pair of slots in said chuck member, said locking fingers extending longitudinally along the outer sidewall of said chuck member, with the other mutually corresponding ends of said locking fingers being pivotally attached to the anchor plate so that the locking fingers are adapted for longitudinal movement along said chuck member with said housing as well as for pivotal movement of the hook ends thereof outwardly away from said chuck member;

spring means mounted between said anchor plate and said face plate biasing said housing to a rest position away from said one end of said chuck member;

means for pivoting said hook ends of said finger members inwardly through said slots in said chuck member when said housing is in its biased, rest position;

means for pivoting said hook ends of said finger members outwardly from said slots in said chuck member so that the hook ends pivot back at least to the inner surface of the bore in said chuck member when said housing is pushed toward said one end of said chuck member against the biasing force of said spring means; and means for locking the housing in its biased, rest position when the chuck assembly is being rotated about the longitudinal axis of said chuck member.

2. A chuck assembly in accordance with claim 1, wherein said housing comprises a cylindrical section open at one end which forms the circular open end of said housing, a truncated conical section having its base end attached to the other end of said cylindrical section so as to extend coaxially outwardly from the other end of said cylindrical section, and a dome or cup-like member attached to and extending from the truncated end of said conical section, said cup-like member having an opening therein which forms the opening in said other end of said housing;

said anchor plate is mounted on the inside of the cup-like member of said housing, with a pair of torque shafts mounted diametrically opposite each other on said anchor plate, so that the torque shafts extend through the conical section and cylindrical section of said housing substantially parallel to the axis through the ends of the housing;

said face plate on the chuck member has two openings therein which are adapted for slidably receiving the respective torque shafts of said anchor assembly; and said means for locking the housing in its biased, rest position comprises a pair of locking arms pivotally mounted, respectively, to said torque shafts which extend from the anchor plate and a pair of locking weights attached, respectively, to the free ends of the locking arms, whereby when the housing is in its biased, rest position and the chuck assembly is rotated about the longitudinal axis of the chuck member, the locking arms pivot outwardly so that the locking weights are held against the inside surface of the cylindrical section of the housing thereby preventing the housing from longitudinal movement along the chuck member, and whereby when the rotation of the chuck assembly is stopped, the housing can be moved along the chuck member inasmuch as the locking weights are then readily pivoted inwardly by the surface of the conical section of the housing.

3. A chuck assembly in accordance with claim 2, wherein the spring means mounted between said anchor plate and said face plate comprises a pair of coil springs positioned, respectively, around said torque shafts.

4. A chuck assembly in accordance with claim 3, wherein a second pair of diametrically opposed slots extend inwardly in the cylindrical wall of said chuck member substantially parallel to the longitudinal axis of said chuck member from said one end thereof to said face plate mounted near said one end thereof, said second pair of slots having opposite facing notches in the mutually respective sides thereof.

5. A chuck assembly in accordance with claim 4, further in combination with a work arbor, said arbor having one end thereof adapted to be engaged in the bore of said chuck member, said one end of the arbor also having ears extending outwardly therefrom which are adapted to slide into said second pair of slots in the chuck member and engage the notches in said second pair of slots, and said one end of said arbor further having a shoulder circumscribed therearound which is adapted to be engaged by the hook ends of said locking fingers when the arbor is engaged in the chuck member.

* * * * *